United States Patent [19]
Fukumaru et al.

[11] Patent Number: 5,276,836
[45] Date of Patent: Jan. 4, 1994

[54] DATA PROCESSING DEVICE WITH COMMON MEMORY CONNECTING MECHANISM

[75] Inventors: Hiroaki Fukumaru; Siochi Takaya; Yoshihiro Miyazaki, all of Hitachi, Japan; Daniel M. McCarthy, Phoenix, Ariz.

[73] Assignees: Hitachi, Ltd., Tokyo, Japan; Arix Computer, San Jose, Calif.

[21] Appl. No.: 639,353

[22] Filed: Jan. 10, 1991

[51] Int. Cl.⁵ .................. G06F 13/00; G06F 13/28; G06F 13/20
[52] U.S. Cl. .................. 395/425; 364/DIG. 1; 364/243.41; 364/243.43; 364/228.1
[58] Field of Search .................. 365/49; 395/425; 364/DIG.

[56] References Cited

U.S. PATENT DOCUMENTS

| | | | |
|---|---|---|---|
| 4,084,231 | 4/1978 | Capozzi et al. | 364/200 |
| 4,928,225 | 5/1990 | McCarthy et al. | 364/200 |
| 4,933,835 | 6/1990 | Sachs et al. | 364/200 |
| 5,034,885 | 7/1991 | Matoba et al. | 364/200 |
| 5,140,681 | 8/1992 | Uchiyama et al. | 395/425 |

Primary Examiner—Alyssa H. Bowler
Attorney, Agent, or Firm—Antonelli, Terry, Stout & Kraus

[57] ABSTRACT

A data processing device which includes a common memory connecting mechanism which is located between a memory bus to which copyback cache is connected, and a common memory. The common memory connecting mechanism includes a slave type transfer mechanism which directly assesses the common memory bypassing the cache and processes thereof, and a data mover which transfers data between the common memory and main memory.

4 Claims, 9 Drawing Sheets

FIG. 3

| ADDRESS | CONTENT | ENTER AND RESPONSE |
|---|---|---|
| 0XXXXXXX ⎫<br>⎬<br>7XXXXXXX ⎭ | MAIN MEMORY<br><br>MAIN MEMORY | MAIN MEMORY OR CACHE |
| 8XXXXXXX | COMMON MEMORY | COMMON MEMORY CONNECTION MECHANISM |
| FFFFFXXX ↓ | REGISTER IN COMMON MEMORY CONNECTING MECHANISM | COMMON MEMORY CONNECTION MECHANISM |
| 000 | MAIN MEMORY ADDRESS FOR COPY START (50) | |
| 004 | COMMON MEMORY ADDRESS FOR COPY START (46) | |
| 008 | COPY BYTE NUMBER (49) | |
| 00C | COPY START REQUEST (47) | |
| | | |
| 1XX | OTHER REGISTERS IN COMMON MEMORY CONNECTING MECHANISM | |

DATA PROCESSING DEVICE WITH COMMON MEMORY CONNECTING MECHANISM

The present invention relates to a data transfer control method of a common memory between a plurality of data processing devices, and in particular, relates to a data transfer control method around a memory bus in data processing devices wherein the memory bus employs a copyback cache method.

BACKGROUND OF THE INVENTION

In a system composed of a plurality of data processing devices and a common memory, when the data processing devices include cache memories, it is necessary to have coherency in the information written in the memories. In other words, when information is rewritten by a certain processing device, the other processing devices can use the new information.

A general method for realizing coherency is, as disclosed in Japanese Patent Publication No. 49-12020 (1974), hereinafter referred to as Reference 1. In Reference 1 writing is always carried out on a common memory. Simultaneously the fact of the rewrite is informed to cache memories of the other processing devices, and if there are corresponding addresses in the cache memories these addresses are invalidated. Such method is called as writethrough method.

In the writethrough method, all of the write accesses are input to a memory bus, thereby when performance speed of the processor is enhanced, the memory bus becomes a bottleneck. In particular, in case of a multi processor in which a plurality of processors are connected to one memory bus using the writethrough method, the above bottleneck is fatal because of the performance of the memory bus. For this reason, a copyback cache method has become broadly employed these days in which even if the cache memory is rewritten, the main memory is not rewritten until necessary. The copyback cache method is also assembled into the latest microcomputer chip as disclosed in "32 bits MPU with built-in bus snoop function suitable for multi processor" [NIKKEI ELECTRONICS, 1989, 7, 24, (No. 478), pp 173-179], hereinafter referred to as Reference 2, and in "68040 achieved to 13.5 MIPS by Harvard architecture and optimized command" [NIKKEI ELECTRONICS, 1989, 6, 26. (No. 476), pp 131-140], hereinafter referred to as Reference 3. Also, the copyback cache method is explained in U.S. Pat. No. 4,928,225 "Coherent cache structures and methods", hereinafter referred to as Reference 5.

On one hand, there is a system employing a plurality of data processing devices and a dual common memory for high reliability as disclosed in Japanese Patent Application Laid-Open No. 58-16362 (1983), hereinafter referred to as Reference 4. For a data processing device in such system, it is preferred that the above described copyback cache method to be used. However, different from the case of the writethrough method, the case of the copyback cache method is difficult to maintain coherency. In the copyback cache method, a control flag has to be provided at every entry of caches as disclosed in Reference 2, and further for separating EU (exclusive unmodified) from SU (shared unmodified) at the control flag, the respective cache memories have to watch all of read accesses. In case of a single memory bus such watching is easily realized, however in the system which is constituted by a plurality of components as disclosed in Reference 4, copyback caches of the respective data processing devices have to perform watching of all the accesses to a common memory between data processing devices so that the data transfer ability of the interface between components (in case of Reference 4, the interface cable between the CPU and the common memory) becomes a bottleneck thus creating. Therefore, implementation of the copyback cache method is difficult (in the single memory bus of back plane type performance of about 150M byte/sec is easily achieved however, in case of the interface cable of several meter long performance of at most 20M byte/sec is achieved provided that the technical measures of the same level are employed).

The most simple method for solving the problems is a method in which, when the address to be accessed is in a common memory between data processing devices, a copyback cache is bypassed and the common memory is directly accessed. However, with this method, the copyback cache is not utilized, therefore, when a large amount of data is desired to be transferred to the common memory, for example a transference between a file and the common memory, the load of the memory bus in the data processing device increases, and the performance of the system decreases. One effect of this disadvantage is for example that data which would have been transferred by one transference of a 64 byte block if the cache were usable, requires instead that the data be transferred by 16 transferences of 4 byte. Thus, the load of memory bus extremely increases substantially.

SUMMARY OF THE INVENTION

An object of the present invention is to provide an appropriate control method which takes advantage of coherency and high speed of cache when connecting a common memory between processing devices to data processing devices employing the copyback cache method.

The present invention is characterized in that, in a common memory connecting mechanism located between a memory bus to which a copyback cache is connected and a common memory, in addition to a slave type transfer mechanism which accepts a direct access bypassing the cache and processes thereof, a data mover is provided in which transference with the common memory is performed by accessing the memory bus as a bus master.

A large amount of data transference between a main memory and a common memory is performed by a data mover as a bus master so that coherency of a copyback cache is maintained. Further, for the transfer through a memory bus, a block transference can be used, the load of the bus is reduced. On one hand, the data transference between an I/O and the common memory is divided into two in that, a transference (by means of DMA mechanism of the I/O) from the I/O to the main memory through the copyback cache and a transference (by means of the data mover) from the main memory (or cache) to the common memory, so that the cache is effectively utilized and the load of the memory bus greatly reduced.

BRIEF DESCRIPTION OF THE DRAWINGS

FIG. 3 shows an address map of the memory bus;

DETAILED DESCRIPTION OF THE PREFERRED EMBODIMENTS

Hereinbelow, one embodiment of the present invention is explained.

Figure 1:
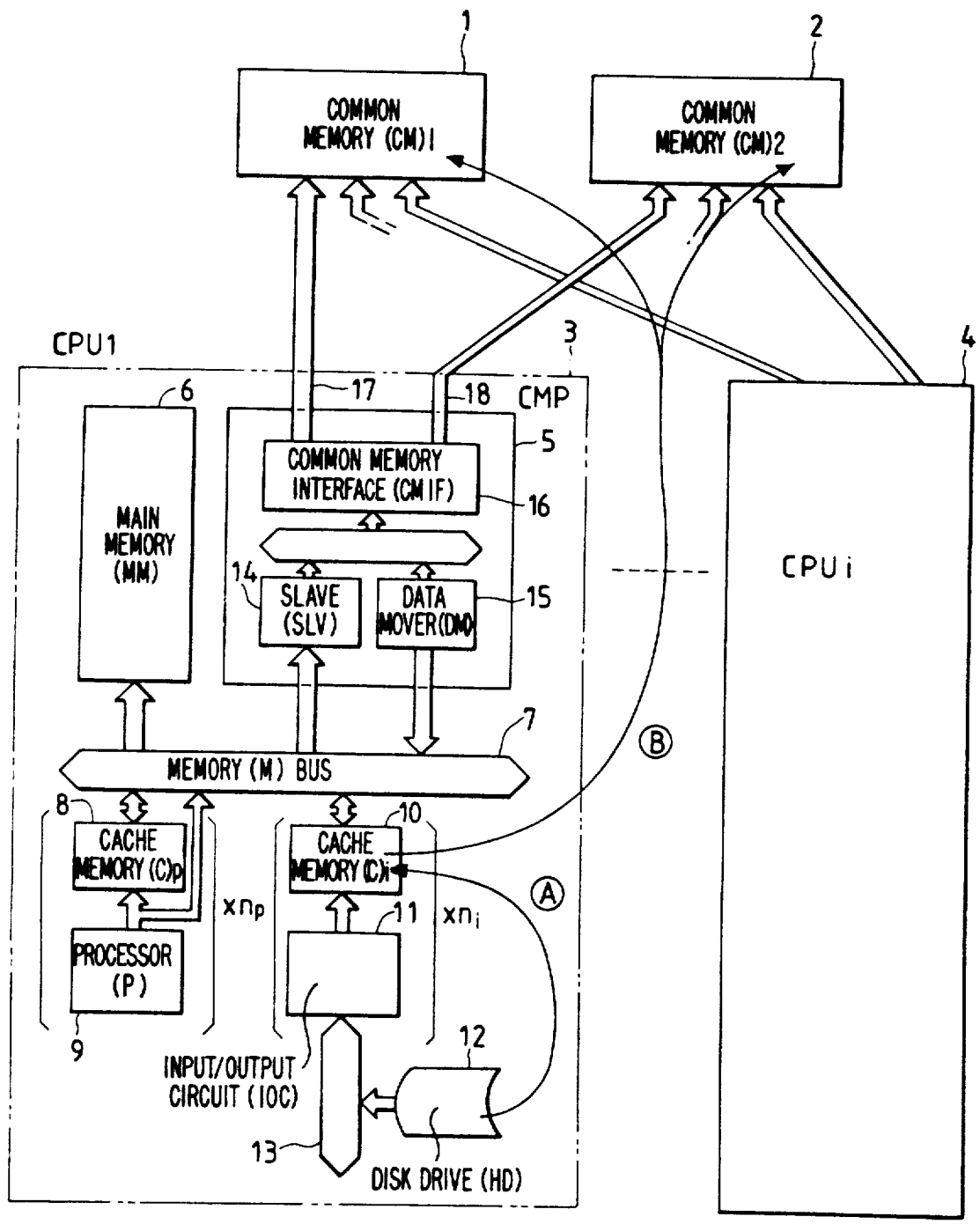
FIG. 1 shows an overview constitution of the system.

FIG. 1 shows the overview constitution of the system. Dual common memories 1, and 2 (CM1,CM2) are accessed by a plurality of data processing devices 3, and 4.

The data processing device 3 (CPU1) is constituted by a memory bus 7, a main memory 6, a common memory connecting mechanism 5, a processor 9 and its copyback cache memory 8, an input/output transfer mechanism 11 and its copyback cache memory 10. To the input/output transfer mechanism 11 such as an input/output bus 13 and a disk device 12 are connected. The processor 9 and its cache 8 of one or plural sets ($n_p$ sets) are connectable to the memory bus 7. Further, the input/output transfer mechanism 11 and its cache 10 of one or plural sets ($n_i$ sets) are also connectable to the memory bus 7.

The processor 9 accesses to the main memory 6 through the cache 8 and the memory bus 7. When an address designates the common memory (CM), the accesses hit the common memory connecting mechanism 5 through the memory bus 7 while bypassing the cache 8.

The input/output transfer mechanism 11 accesses to the main memory 6 through the cache 10 and the memory bus 7.

The individual caches 8 and 10 are cache memories of copyback method, and which watch the memory bus 7. When only the caches themselves hold the latest data of the address of which read is requested, the data is outputted to the memory bus for the main memory and when the same data held by themselves are detected to be rewritten by other processors 9 or the input/output transfer mechanism 11, is invalidated the data holding by themselves as explained in Reference 5.

The common memory connecting mechanism 5 has an interface portion 16 with the common memories 1 and 2, a slave type transfer mechanism 14, and a data mover 15. An access from the processor 9 through the memory bus is accepted by the slave type transfer mechanism 14, the common memories 1 and 2 are accessed through the above interface portion 16, and a response is returned to the memory bus. The data mover 15, which is a characteristic part of the present invention, includes means for accessing data of the main memory 6 (or the cache memory 8 or 10) and means for accessing the memory through common memories 1 and 2, through interface portion 16 by accessing the memory bus as a bus master, and performs data copy between the main memory 6 (or cache memories 8 and 10) and the common memories 1 and 2.

The direction of the arrow of the data path in FIG. 1 shows the direction of access (the transfer direction of request signals and addresses) for facilitating the understanding of the above explanation. Among the units connected to the memory bus 7, the main memory 6 and the slave type transfer mechanism 14 which are the destinations of transfers indicated by the arrow are bus slaves, and the data mover mechanism 15 which is the source of transfer indicated by the arrow is a bus master. Since the caches 8 and 10 output access requests to the memory bus, they are bus masters, on the other hand in considering that they watch buses and output the latest data for the main memory, they are bus slaves. Data transfer from an input/output device, for example the disk device 12 to the common memories 1 and 2 is carried out while dividing thereof into two as follows. Initially, data is transferred from the disk device 12 to the cache 10 (or the main memory 6) through the input-/output bus 13 and the input/output transfer mechanism 11 (transfer <A> in FIG. 1). This transfer is carried out by a DMA (Direct Memory Access) mechanism (not shown) in the disk device 12. Since the address during the access to the memory bus 7 is the address for the main memory 6, the copyback cache memory 10 functions effectively, the transfer with the main memory on the memory bus is made in blocks, and the load of the memory bus 7 is reduced. Nextly, data transfer from the cache 10 (or the main memory 6) to the common memories 1 and 2 is performed through the memory bus 7, the data mover 15 and the common memory interface portion 16 (transfer <B> in FIG. 1) This transfer is carried out by the data mover 15. Since the address during the access to the memory bus 7 is the address for the main memory 6, the copyback cache memory 10 functions effectively, the transfer from the main memory 6 or the cache 10 on the memory bus 7 is made in blocks, and the load of the memory bus 7 is reduced. Then, the data mover 15 transfers the data from the memory bus 7 to the common memory interface portion 16. Finally the common memory interface portion 16 transfers the data to the common memories 1 and 2. The transfer from the common memories 1 and 2 to the disk device 12 is similar to the above except that the execution order of the transfers <A> and <B>, and the data transfer direction are opposite, and likely the copyback cache is effectively utilized.

Figure 2:
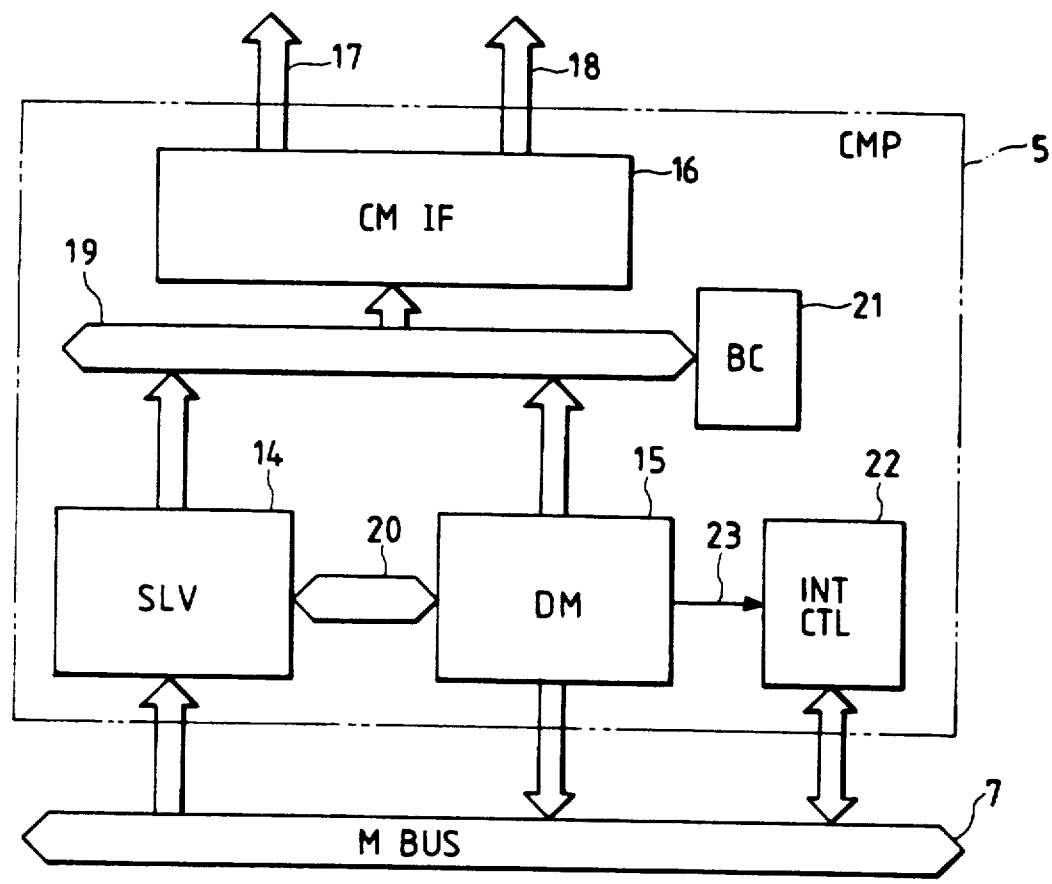
FIG. 2 shows an internal constitution of the common memory connecting mechanism.

FIG. 2 shows the internal constitution of the common memory connecting mechanism 5. The common memory interface portion 16 enters access requests received through the internal bus 19, accesses the common memories 1 and 2 through an interface 17 and an interface 18 and returns a response to the internal bus 19 (detail of which is explained in Reference 4).

The slave type transfer mechanism 14 accepts access requests (including address and write data) received through the memory bus 7, which will be explained later with reference to FIG. 3, checks the address content, accesses to the common memories 1 and 2 when it is an access request to the common memories 1 and 2 by means of the slave type transfer mechanism 14, through the internal bus 19 and the common memory interface portion 16 and returns a response (including read data) to the memory bus 7. Further, as the result of the address content check, when it is a control request to the data mover 15, the slave type transfer mechanism 14 performs a control (including start information setting such as of copy start address and copy byte number) for the data mover 15 through the interfaces 20.

Based on the start information received through the interface 20, the data mover 15 accesses the main memory 6 (or cache 8 or 10) as well the common memory 1 or 2 through the internal bus 19 and the common interface 16 by accessing the memory bus 7 as a bus master, and thereby the data copy from the main memory 6 (or cache 8 or 10) to the common memory 1 or 2 or from the common memory 1 or 2 to the main memory 6 (or cache 8 or 10) is performed. When the data copy of requested byte number is completed, a completion signal 23 is asserted and a completion interruption mechanism 22 is initiated.

When the completion interruption mechanism 22 detects the assertion of the completion signal 23, it interrupts the processor 9 through the memory bus 7 and reports the completion of data copy.

An internal bus controller 21 is a bus selection right determining circuit and determines dynamically which the slave type transfer mechanism 14 or the data mover 15 be granted the selection right.

FIG. 3 shows an address map on the memory bus 7. As will be apparent from the drawing, when the addresses are from 0XXXXXXX to 7XXXXXXX, it indicates that the main memory 6 or the cache accepts the access and returns the response, and when the addresses are 8XXXXXXX and FFFFFXXX it indicates that the common memory connecting mechanism 5 accepts the access and returns the response and the contents of these addresses are checked in the slave type transfer mechanism 14 of the common memory connecting mechanism 5 and when the address is 8XXXXXX the access to the common memory and the processing are performed by the slave type transfer mechanism 14 and when the address is FFFFFXXX the slave type transfer mechanism 15 performs setting on start information for the data mover 15 and causes access to the common memory and the processing by the data mover. Further, as shown in FIG. 3, the slave type transfer mechanism 14 set several kinds of control signals 46, 47, 49 and 50 on the data mover 15 in response to the numeral values at the lower three digits in the address of FFFFFXXX.

Figure 4:
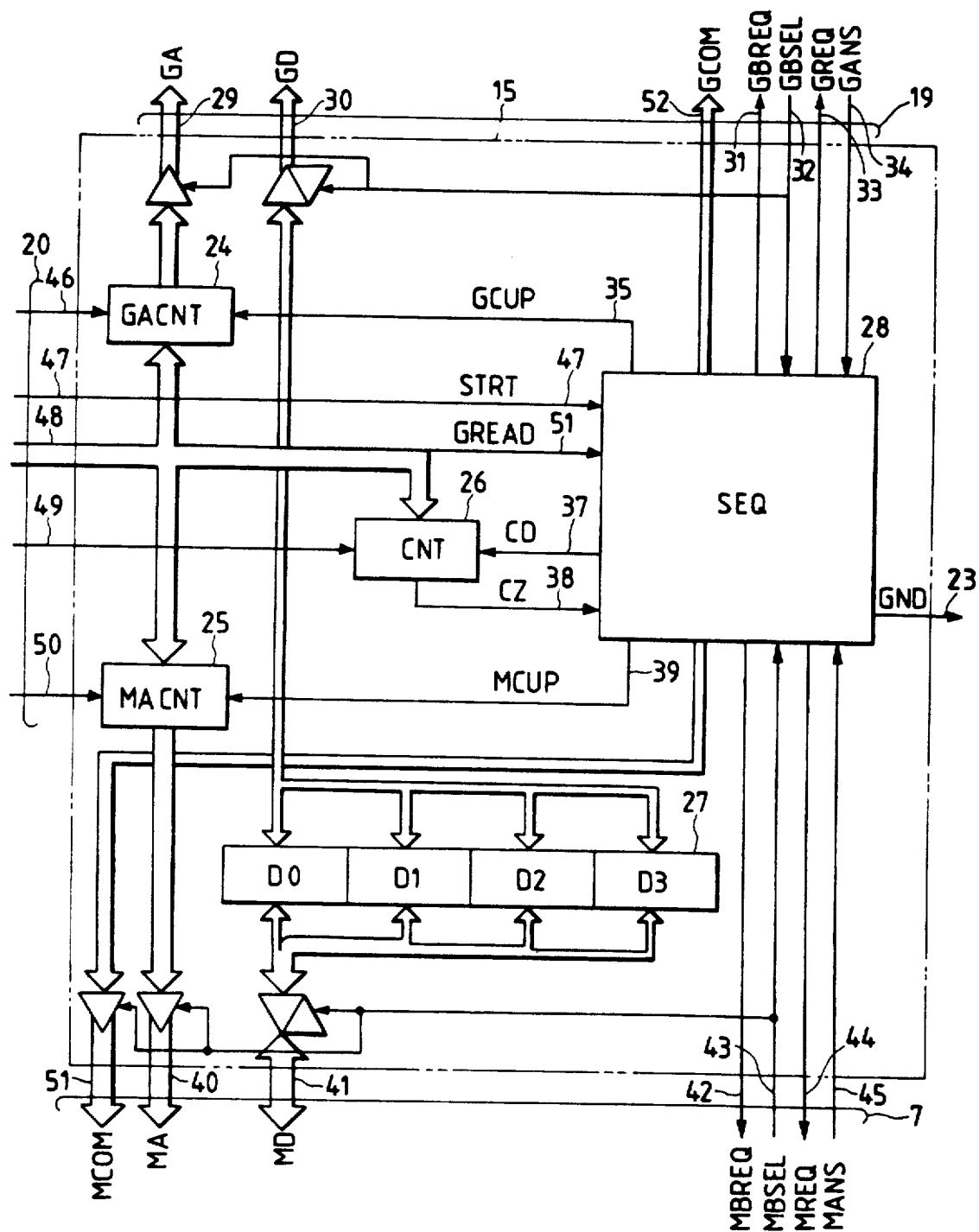
FIG. 4 shows an internal constitution of the data mover.

FIG. 4 shows the internal constitution of the data mover 15. GACNT 24 is a register for setting a common memory address to be copied. When a signal 46 for setting a common memory address of copy initiation is asserted, the content of a data signal 48 is set at the GACNT. When a signal GCUP 35 is asserted, the content of the GACNT is counted up by +4 (access unit of the common memory). MACNT 25 is a register for setting a main memory address to be copied. When a signal 50 for setting a main memory address of copy initiation is asserted, the content of the data signal 48 is set at the MACNT. When a signal MCUP 39 is asserted, the content of the MACNT is counted up by +16 (block access unit of the copyback cache). D0 D3 are data registers of 16 bytes, and when access to the common memory, every four bytes are transferred through a signal 30. Further, when accesses to the main memory 16 bytes are at once transferred through a signal 41. CNT 26 is a register for setting a copy byte number. When a signal 49 for setting copy byte number is asserted, the content of the data signal 48 is set at the CNT. When a signal CD 37 asserted, the content of the CNT is counted down by 16. When the count-down results in 0, a signal CZ 38 is asserted. A sequencer 28 performs control of the data mover. A signal STRT 47 is a start initiation demand signal for the data mover. A signal GREAD 51 designates the data copy direction. The lower most bit of the data signal 48 is applied for the designation, in that, when the bit is 0 the copy direction from the main memory to the common memory and when the bit is 1 the copy direction from the common memory to the main memory are respectively designated. GBREQ 31 is an occupation request signal for the internal bus 19. GBSEL 32 is an occupation allowance signal for the internal address bus 19. GREQ 33 is an access request signal to the common memory through the internal bus 19. GANS 34 is an access response signal to the common memory through the internal bus. GCOM 58 is a command type signals (read/write). GA 29 is address signals. GD 30 is data signals. These are used when the sequencer 28 accesses the common memory. On one hand, MBREQ 42 is an occupation request signal of the memory bus 7, MBSEL 43 is a an occupation allowance signal of the memory bus 7, MREQ 44 is an access request to the main memory through the memory bus 7, and MANS 45 is an access response signal to the main memory through the memory bus 7. MCOM 51 is command type signals (read/clear & write). MA 40 is address signals. MD 41 is data signals. These are used when the sequencer 28 accesses to the main memory. In case of write operation, command type signals is "clear & write". "Clear" means that cache (8 or 10) invalidates entries corresponding to the address on MA 40. (As for the concept of the clear command, please refer to reference 5.) Further a signal 23 is one indicating the completion of data copy, and is asserted when the sequencer 28 has completed a series of data copy.

Figure 5:
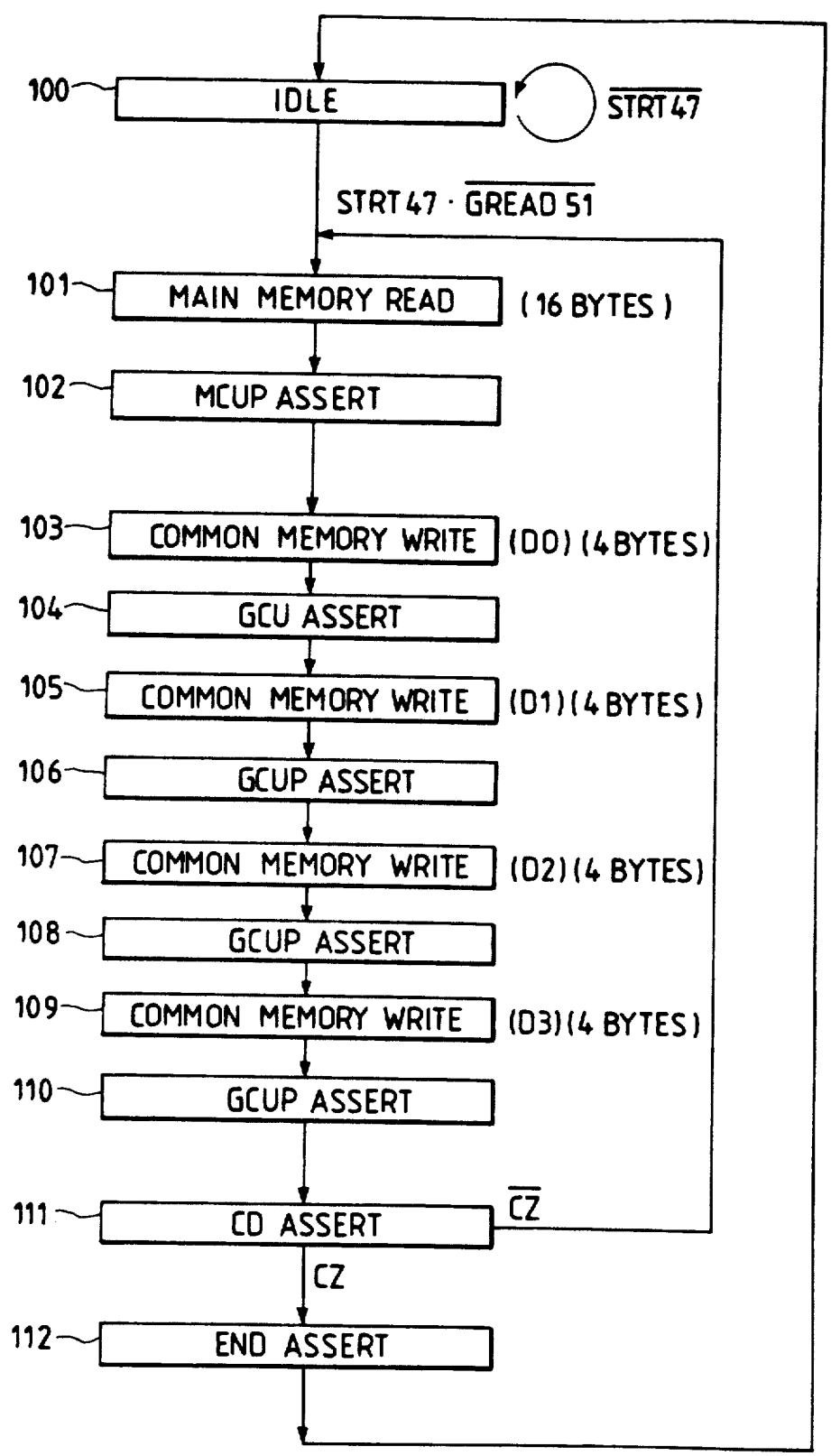
FIG. 5 shows a flow chart of the data mover sequencer (from the main memory to the common memory)

FIG. 5 shows a flow chart of the sequencer 28. This flow chart shows one where the data copy direction is from the main memory to the common memory. In step 100, the start signal STRT 47 waits for an assert. When started the main memory is read in step 101. 16 bytes which is a block size of the cache are read and set at D0, D1, D2, and D3. In step 102, the signal MCUP 39 is asserted and the main memory address resister is incremented by 16. In step 103, the common memory is written. 4 byte content of D0 is written. In step 104, the signal GCUP 35 is asserted, and the common memory address register is incremented by 4. Likely, in steps from 105 to 110 the contents in D1, D2, and D3 are written sequentially. Thereby data totaling 16 bytes is copied from the main memory to the common memory. In step 111, the signal CD 37 is asserted and the copy byte number is decremented by 16. As the result, when the copy byte number becomes zero, the sequence proceeds to step 112 because the signal CZ 38 is asserted, if not zero the sequence returns to step 101. In step 112 the completion signal END 23 is asserted and the sequence returns to the initial condition.

Figure 6:
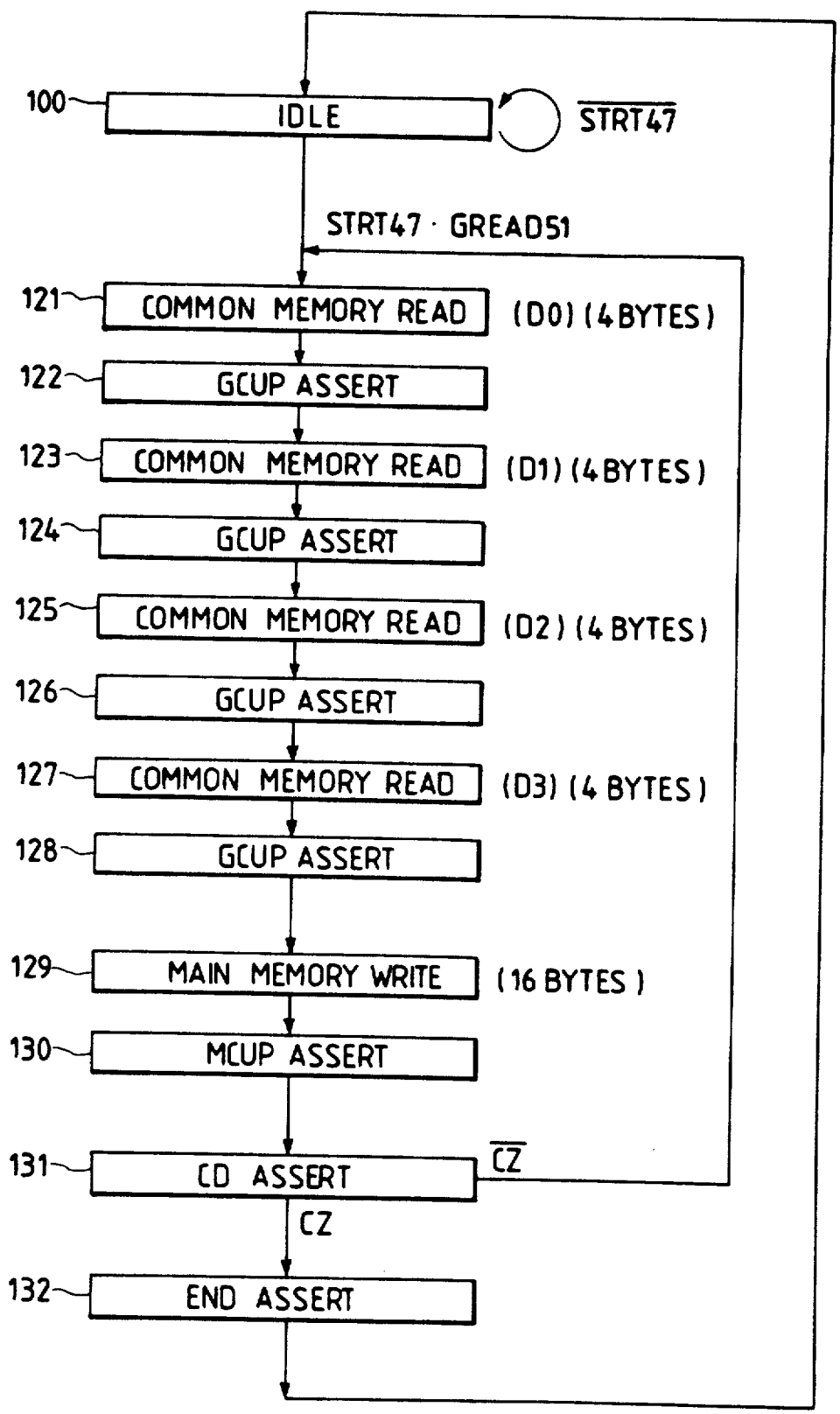
FIG. 6 a flow chart of the data mover sequencer (from the common memory to the main memory)

FIG. 6 shows a flow chart of the sequencer 28 wherein the copy direction is from the common memory to the m in memory. The sequence thereof is substantially the same as that explained in connection with FIG. 5, the explanation of FIG. 6 is omitted.

Figure 7:
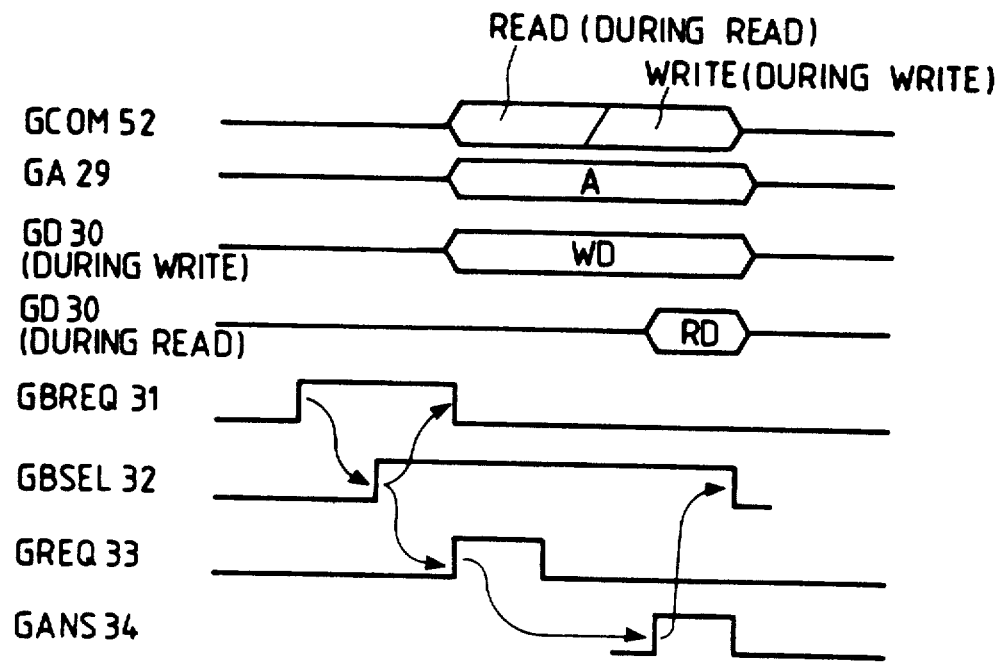
FIG. 7 shows a time chart during the common memory read/write.

FIG. 7 shows a time chart during the common memory read/write. When the bus occupation request GBREQ31 is asserted, and the bus occupation allowance GBSEL 32 is rendered on, the access request 33 is asserted and when the access response 34 is rendered on, the access is completed.

Figure 8:
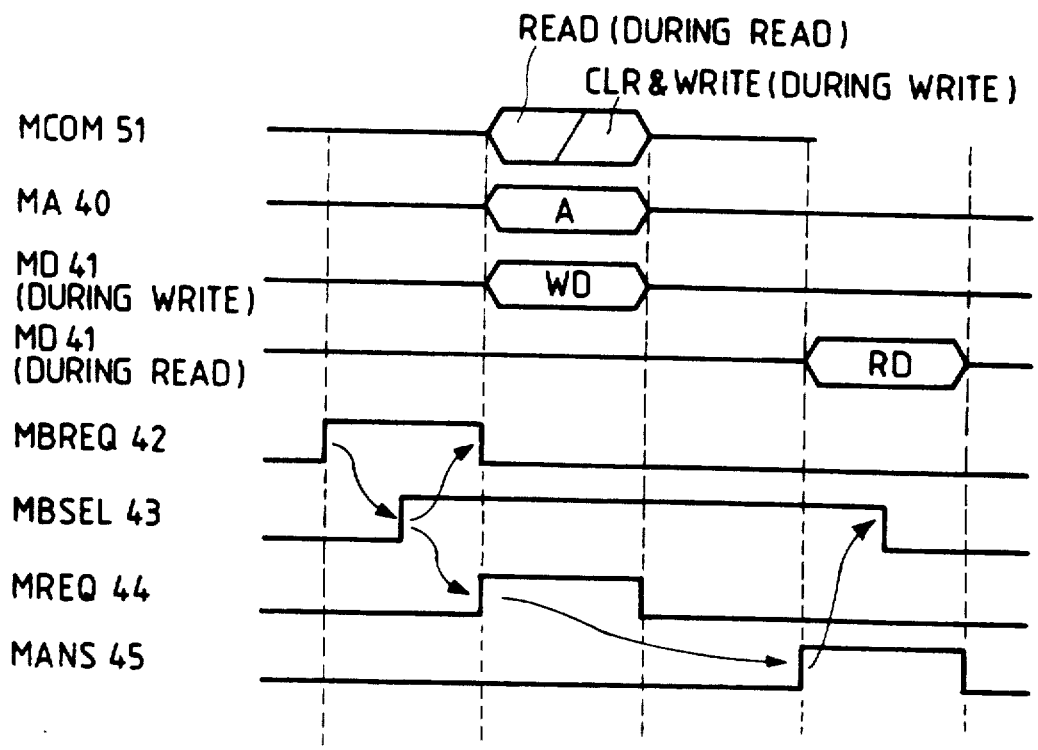
FIG. 8 shows a time chart during the main memory read/write.

FIG. 8 shows a time chart during the main memory read/write. Since the sequence is substantially the same as in FIG. 7, the explanation thereof is omitted. Previously, during writing in the copyback cache method, the all data in the block access unit principally had to be read before the data is partially written into the block access unit. However the data mover in the present embodiment, there is no need to consider preservation of original data. Therefore, the ownership of the block access unit of cache 8, 10 is cleared through the use of a clear command and the read is omitted. The deletion of this read operation and its associated data transfers substantially reduce the load on the memory bus, thereby improving system performance. (As for clear command, refer to Reference 5.)

Figure 9:
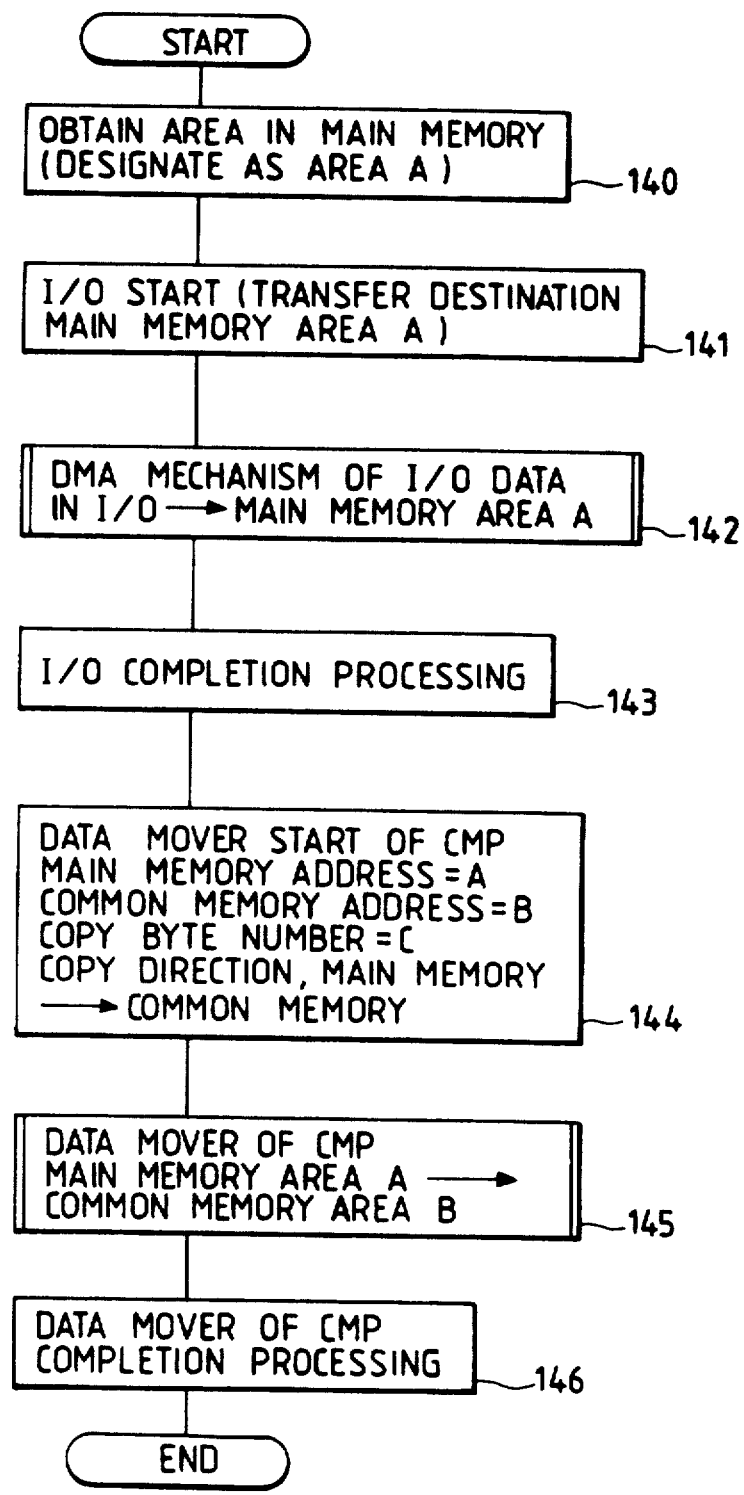
FIG. 9 shows a flow-chart of the system program (from the I/O to the common memory); and, FIG. 10 shows a flow chart of the system program (from the common memory to the I/O).

FIG. 9 shows a flow chart of a system program when data is transferred from I/O to the common memory. In step 140 a buffer area is obtained in the main memory. This area may be newly obtained at every time or may be assigned before hand. In step 141, the I/O is started. In step 142, by means of the DMA (Direct Memory Access) mechanism in the I/O the data in I/O is transferred to the area A of the main memory (assuming that transfer byte number is C). At this moment, since the copyback cache is effective, the respective accesses (for example by 2 byte unit) from the DMA are written only on the cache, and only when the block of 16 in the cache becomes full by the accesses of 2 byte×8 times, the accesses are transferred in blocks to the main memory through the memory bus. When the DMA transfer of the I/O is completed, a completion interruption is generated, and I/O completion processing in step 143 is performed. Thereafter in step 144 the data mover 15 is started. The address of transfer source is in the area A of main memory and the address of transfer destination is in the area B of the common memory. Detail sequence thereof is as follows, after setting A as the main memory address for copy source, B as the common memory address for copy destination, and C as the copy byte number, on the address map shown in FIG. 3, the copy start request is set to 0 (which designates the direction of copy from the main memory to the common memory). In step 145, by means of the data mover 15 data of C bytes is transferred from the area A of the main memory to the area B of the common memory. At this moment, the copyback cache is effective, and as seen from the flow in FIG. 5 read of the main memory is performed in the block unit of the cache. When the data transfer by the data mover is completed, a completion interruption is generated, the completion processing of the data mover is performed in step 146. As explained above, the transfer between the I/O and the common memory is divided into two in that, the transfer between the I/O and the main memory (cache) and the transfer between the main memory (cache) and the common memory. The performance of the copyback cache is utilized to its maximum and the coherency is maintained.

Figure 10:
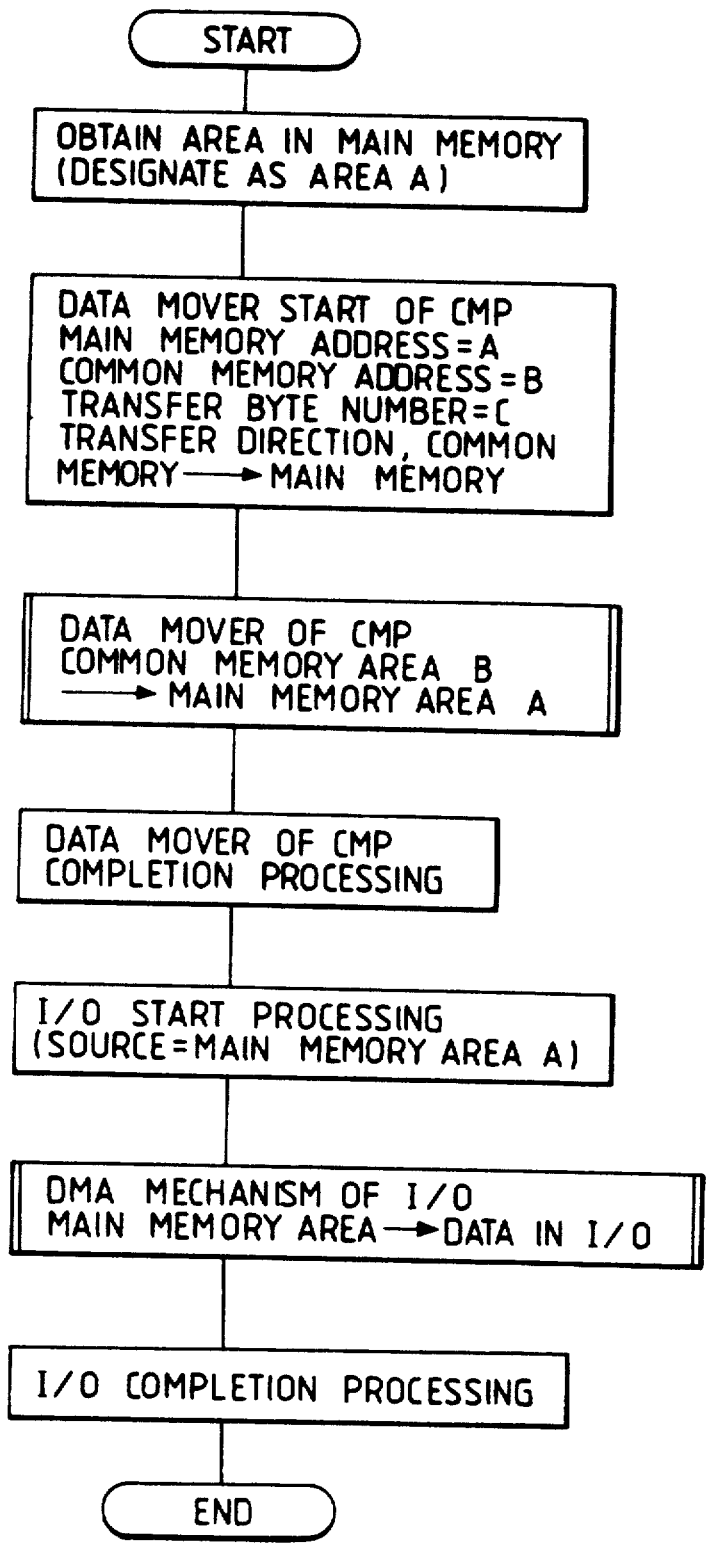

FIG. 10 shows a flow chart of the system program in which the data is transferred from the common memory to the I/O. Since the flow is substantially the same as in FIG. 9, the explanation thereof is omitted.

All of the embodiments of the present invention have been explained in above.

As one of application examples of the present invention, one of a plurality of processors may be applied as data copy means of bus master type. However in this case, this processor must be provided with an exclusive data bus for accessing the common memory and it is necessary no influence is affected to the load of the memory bus during the data copy.

As explained above, with the present invention, during transfer with the common memory of a large amount of data including data transfer with the I/O, the copyback cache memory is utilized effectively by means of the data mover and a high through put can be obtained.

Further, with regard to a single access to the common memory by a program (a processor), the common memory can be directly accessed while bypassing the cache a explained in FIG. 1 so that the common memory system with an excellent response can be provided.

We claim:

1. A data processing device, connected to a common memory, having at least one memory bus, a main memory connected to said at least one memory bus, a processor having at least one built-in copyback cache memory connected to said at least one memory bus, said common memory being connected between said data processing device and a plurality of other data processing devices, and connecting means connected between said at least one memory bus and said common memory, said connecting means comprising:
   memory bus slave type transfer means for directly accessing said common memory, bypassing said copyback cache memory, to obtain data at a particular address in said common memory; and
   memory bus master type data copy means for transferring data between said common memory and said main memory,
   said memory bus type transfer means and said memory bus master type data copy means being selectable by said processor.

2. A data processing device according to claim 1, further comprising:
   means for sending out an access request to said memory bus slave type transfer means of said connecting means while bypassing said copyback cache memory.

3. A data processing device according to claim 1 wherein said memory bus master type data copy means receives information including a main memory start address, a common memory start address and a transfer byte number from said processor, and after completing corresponding data copy, informs the completion to said processor.

4. A data transfer control method of a common memory in a data processing device having at least one memory bus, a main memory connected to said at least one memory bus, a processor having at least one built-in copyback cache memory connected to said at least one memory bus, said common memory being connected between said data processing device and a plurality of other data processing devices, and connecting means connected between said at least one memory bus and said common memory, said method comprising the steps of:
   directly accessing said common memory, bypassing said copyback cache memory, to obtain data at a particular address in said common memory; and
   transferring data between said main memory and said common memory,
   said directly accessing and said transferring step being selectable by said processor,
   said transferring step including the steps of:
   transferring data between an input/output device, through a direct memory access (DMA) means of said input/output device, and said main memory and said copyback cache, and
   transferring data between said main memory and said copyback cache through said memory bus master type data copy means, and said common memory.

* * * * *